US011722858B2

(12) United States Patent
Kodaypak

(10) Patent No.: US 11,722,858 B2
(45) Date of Patent: Aug. 8, 2023

(54) DOMAIN SELECTION FOR SHORT MESSAGE DELIVERY INCLUDING IN 5G OR OTHER NEXT GENERATION NETWORKS

(71) Applicant: AT&T Intellectual Property I, L.P., Atlanta, GA (US)

(72) Inventor: Rajendra Prasad Kodaypak, Sammamish, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 140 days.

(21) Appl. No.: 16/881,247

(22) Filed: May 22, 2020

(65) Prior Publication Data
US 2021/0368305 A1 Nov. 25, 2021

(51) Int. Cl.
*H04W 4/14* (2009.01)
*H04W 84/12* (2009.01)
*H04W 84/04* (2009.01)

(52) U.S. Cl.
CPC ............ *H04W 4/14* (2013.01); *H04W 84/042* (2013.01); *H04W 84/12* (2013.01)

(58) Field of Classification Search
CPC ...... H04W 4/14; H04W 84/042; H04W 84/12
See application file for complete search history.

(56) References Cited

U.S. PATENT DOCUMENTS

| 2009/0047967 | A1* | 2/2009 | Zhu | H04L 51/214 455/445 |
| 2015/0011250 | A1* | 1/2015 | Xu | H04W 4/14 455/466 |
| 2019/0297121 | A1* | 9/2019 | Qiao | H04L 65/1016 |
| 2019/0306695 | A1* | 10/2019 | Kim | H04W 48/17 |

* cited by examiner

*Primary Examiner* — Marcus Hammonds
(74) *Attorney, Agent, or Firm* — Amin, Turocy & Watson, LLP

(57) ABSTRACT

The disclosed technology is directed towards an integrated short message service (SMS) function and short message service center function that delivers mobile terminated messages by selecting among access domains for to endpoints based on their capabilities, e.g., 5G, 5G+, LTE WI-FI, including multimode capabilities. The integrated SMS function determines attributes (e.g., capabilities) of a user equipment destination device for a mobile terminated message, obtains contextual data (e.g., current device reachability, network conditions) for the device, and determines which access and mobility management function (AMF) or mobility management entity (MME) is associated with the device. Based on the various obtained information, the integrated SMS function selects an appropriate access domain based on the capabilities and contextual data, and if the device is reachable, correctly routes the message for delivery. Retry operations can be set up for devices that are not currently reachable.

20 Claims, 10 Drawing Sheets

DOMAIN SELECTION FOR SHORT MESSAGE DELIVERY INCLUDING IN 5G OR OTHER NEXT GENERATION NETWORKS

TECHNICAL FIELD

The subject application relates to wireless communications systems in general, and more particularly to short message service (SMS) message delivery in wireless communications systems, including New Radio (NR) fifth generation (5G) cellular wireless communications systems and/or other next generation networks.

BACKGROUND

In wireless communications, short message service (SMS) message delivery in LTE-EPC (long term evolution-evolved packet core) systems are based on application layer signaling protocols between each set of peer networking functions. In New Radio (NR), the 5G (fifth generation) control plane core network architecture, with several network functions that operate together in a service-based interface framework, is significantly changed relative to the LTE-EPC architecture.

The SMS over NAS (non-access stratum) delivery in a 5G core network is based on SMSF (short message service function), a network function that needs to interwork with another core function, AMF (access and mobility management function) on one end and the SMS service center (SMSC) on the other. In general, SMS over NAS in a 5G core works between a user equipment and the AMF in a way that is analogous to the behavior between a user equipment and the MME (mobility management entity) in an LTE-EPC network.

The 5G Core network will coexist with the LTE network that has gained maturity over the past few years, and continues to evolve in supporting new mobility services. However, due to the disparate nature of the legacy versus new protocols and complex signaling interactions between 5G and LTE systems, the SMS delivery architecture has become highly, if not overly complicated.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
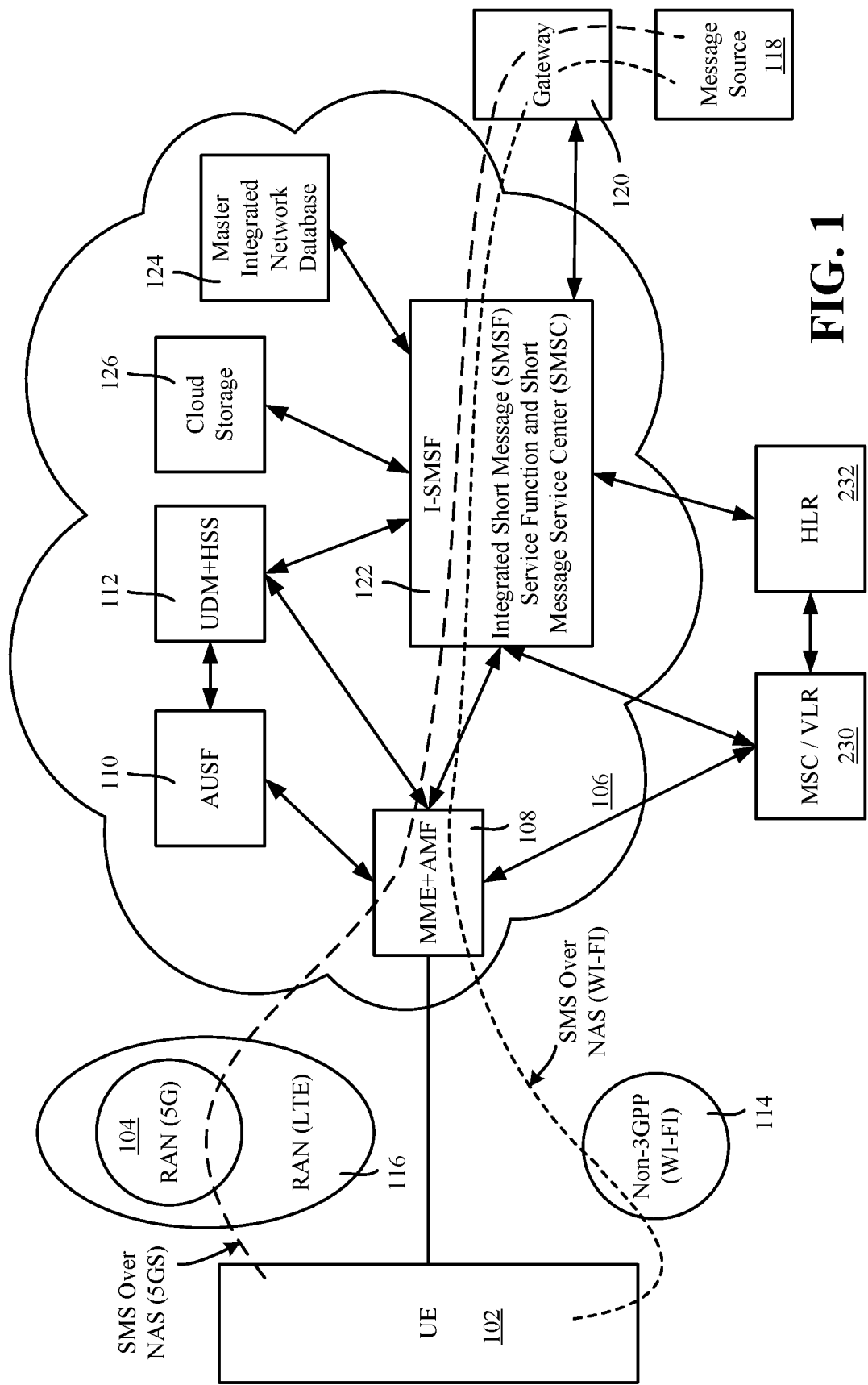
FIGS. 1 and 2 illustrate example mobile terminated short message service (SMS) message delivery routes based on domain access selection by an integrated SMS function and short message service center (SMSC), in accordance with various aspects and embodiments of the subject disclosure.

The technology described herein is generally directed towards SMS (short message service) delivery via an integrated SMS function (SMSF) and SMS center (SMSC), which for brevity herein is referred to as an "integrated SMS function." The integrated SMS function facilitates intelligent and fine-grained access domain selection via a converged messaging core network function for reliable mobile terminated SMS delivery of mobile terminated messages to user equipment endpoints. As will be understood, the integrated SMS function is thus a network function that acts as a converged SMS delivery center in mobility networks across various access domains, including fifth generation (5G/5G+), fourth generation long term evolution (4G LTE), third generation (3G) and WI-FI, and IMS (internet protocol multimedia subsystem) or non-IMS service domains.

For devices with multimode capabilities (5G, 5G+, LTE and WI-FI) that are registered in more than one radio technology simultaneously, the integrated SMS function works across 3GPP (3rd Generation Partnership Project) technologies as well as non-3GPP radio technologies. The integrated SMS function uses an analytics mapping engine to select the access domain, and can failover based on policy-driven methods to provide a reliable SMS service, including across several IoT (internet of things) industry verticals as well as smartphones.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in the example of FIG. 1, a user equipment (UE) 102 can register via a radio access network (RAN) 5G gNodeB network equipment/coverage area 104 with the core network, represented by the cloud 106. In general, the network determines a target access and mobility management function, or AMF (represented by the MME+AMF 108, wherein MME stands for mobility management entity) for the UE 102, and the UE is authenticated to the network 106 with an authentication server function (AUSF) 110. Unified data management and home subscriber service (for 4G), shown as a UDM+HSS complex 112, manages the user equipment data for access authorization, user registration, and network data profiles. The UDM+HSS 112 may be coupled to a user data repository (not explicitly shown in FIG. 1).

The UE 102 also may connect to the 5G core network 106 via a Non-3GPP interworking function (N3IWF), which is represented in FIG. 1 via the non-3GPP (WI-FI) connection/coverage area 114. The UE also may connect via a RAN LTE network equipment/coverage area 116. The UE 102 may have multi-mode registration capabilities, and thus may be registered to the core network/cloud 106 in multiple ways.

In the example of FIG. 1, a message source 118 is attempting to send a mobile terminated message to the UE 102. As described herein, the mobile terminated message reaches the network 106 via a suitable gateway 120, where the message is obtained by an integrated SMS function (I-SMSF) 122.

In one aspect, the integrated SMS function 122 interrogates a repository function, shown in FIG. 1 as a master integrated network database 124, to determine the capabilities of the destination device. In this way, the integrated SMS function 122 obtains the attributes of the UE 102 in this example. Such attribute data can include whether the device is 5G capable, 4G LTE capable, 3G capable and so on. For example, for a 5G device, if SMS over NAS is supported in 5GS (5G system), the mobile terminated SMS message is to be delivered via the device's serving AMF 108 based on policy definitions in the messaging core network In another aspect, the integrated SMS function 122 can query cloud storage 126 to obtain contextual data for the user equipment 012. Such contextual data can include, but is not limited to, reachability and sleep mode state, retry information (e.g., configurable retry exhaustion per access domain), policy configuration data, blacklisting due to nodal traffic loading and/or utilization, overload conditions, and availability of peer nodes based on MAP (Mobile Application Part) protocol versus Diameter protocol behavior. the integrated SMS function 122 provides service based interface (SBI), Diameter and MAP interface support With the above attribute data and contextual information, the integrated SMS function 122 selects one or more appropriate protocol(s) for delivering the message, e.g., the MAP or Diameter protocol. The integrated SMS function 122 uses the device attribute data to select an access domain. The access domain selection can include primary and secondary options for failover/fallback.

The integrated SMS function 122 interacts with a centralized mapping function to determine the targeted end point based on a policy mapping scheme including device type, device mode, device grouping, access type, location, priority, contextual state, reachability and so forth. Further, based on the communication with the UDM+HSS 112, the integrated SMS function 122 knows which AMF (or MME) is serving the user equipment. In this way, the I-SMSF 122 selects the domain and routes a targeted mobile terminated SMS message delivery for IMS and Non-IMS capable devices, which in the example of FIG. 1 is the UE 102. The integrated SMS function 122 updates an internal mapping table to track the delivery.

Figure 2:
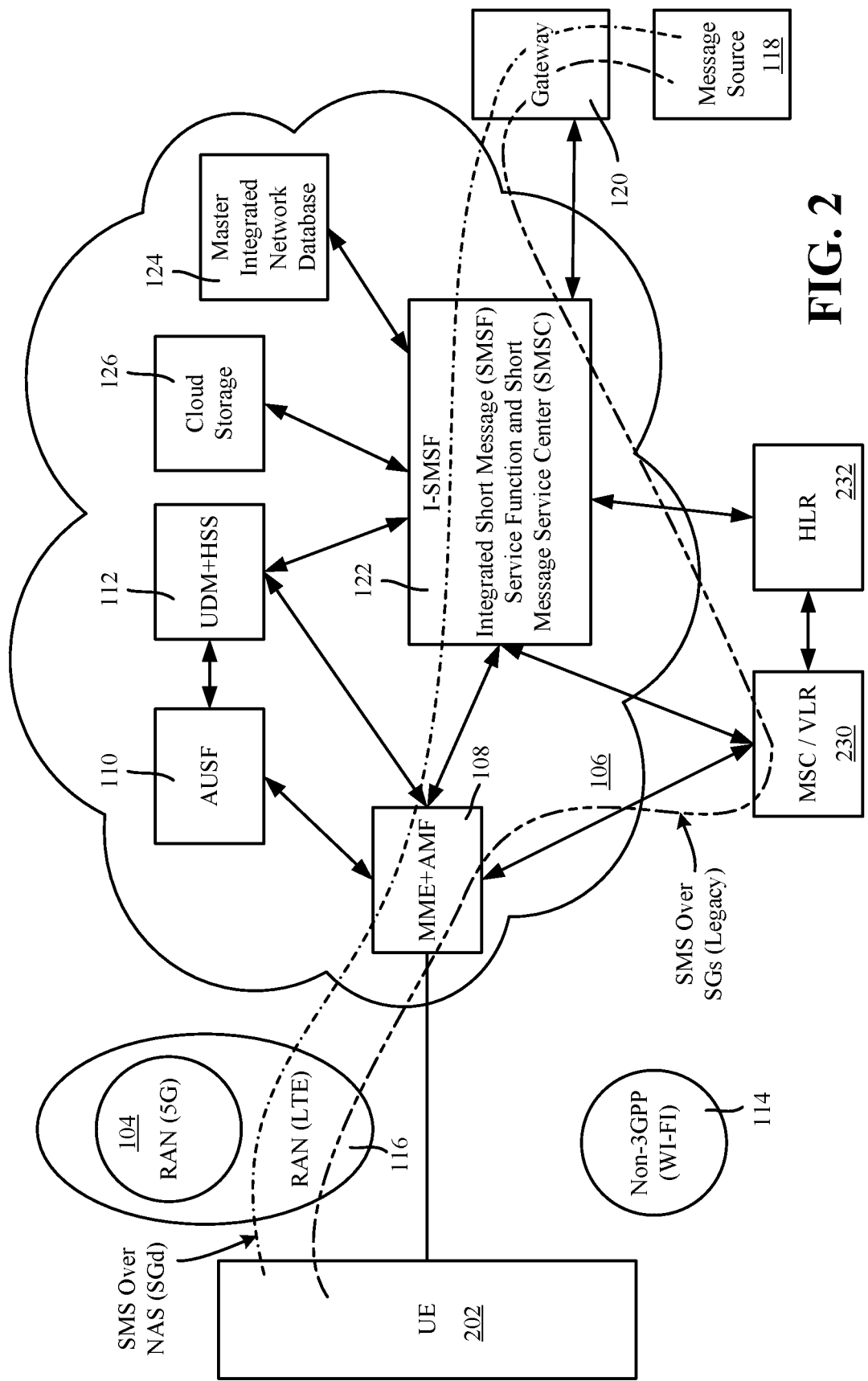

FIG. 2 shows two other possible message SMS mobile terminated messages, namely SMS Over NAS (SGd, or Signaling Gateways Diameter) and an SMS Over SGs (Signaling Gateways, e.g., legacy 3G) message directed towards a UE 202. In general, the integrated SMS function 122 initially operates in the same way to obtain the attribute data (including device capabilities) via the master integrated network database 124. This time, however, the UE 202 may be coupled via an MME instead of the AMF, however this is still represented in FIG. 2 by the MME+AMF 108. Similarly, the HSS may contain the needed routing information instead of the AMF, although both are shown in FIG. 2 as the UDM+HSS complex 112. With this information, and the contextual data obtained from the cloud storage 126, the integrated SMS function 122 knows where to route the message, and what protocols to use.

For an LTE connected device, the SMS Over NAS (SGd) diameter protocol is chosen, and routing through the MME+AMF complex 108 of the mobile terminated message is performed, provided the UE 202 is currently reachable and so forth as determined by its current contextual data. The integrated SMS function 122 is not limited to the 4G LTE retry mechanisms, and, for example, can adopt integrated flexible retry methods based on device categories, access technologies and sleep/wakeup patterns, while storing messages for as long as desired, in contrast to limited SMSC storage. Further, MT-SMS delivery can be guaranteed.

For a 3G or other legacy connected device, the home location register (HLR) 232 provides the data store for the subscriber information, and thus is queried by the integrated SMS function 122. The integrated SMS function 122 selects the MAP protocol for the message, and determines the MME of the UE 202 via the mobile switching center (MSC) and visitor location register (VLR), or MSC/VLR 230; (the VLR contains the location of the user equipment that is in the service area of the MSC). In this way, the integrated SMS function 122 routes the message through the MSC/VLR 230 and the MME 108 to the UE 202.

Thus, as shown in FIGS. 1 and 2, for any message that comes in, the integrated SMS function 122 determines the attribute data for the destination device, as well as the contextual data. The integrated SMS function 122 collapses the SMSC and SMSF into a single entity, and can use the MAP or Diameter protocol as appropriate for the destination UE, as well as communicate with a device accessible through an AMF via WI-FI. The integrated SMSC and SMSF may also support HTTP/2 service based interface for internal communication if required. The integrated SMS function 122 can determine the type of device, the access technology on which the device is registered, the MME or AMF the device is being served by, and the protocols to use to reach the device, while selecting the correct network function the first time. To an extent, the integrated SMS function 122 thus acts as a single gateway with converged access-dependent messaging service delivery.

Figure 3:
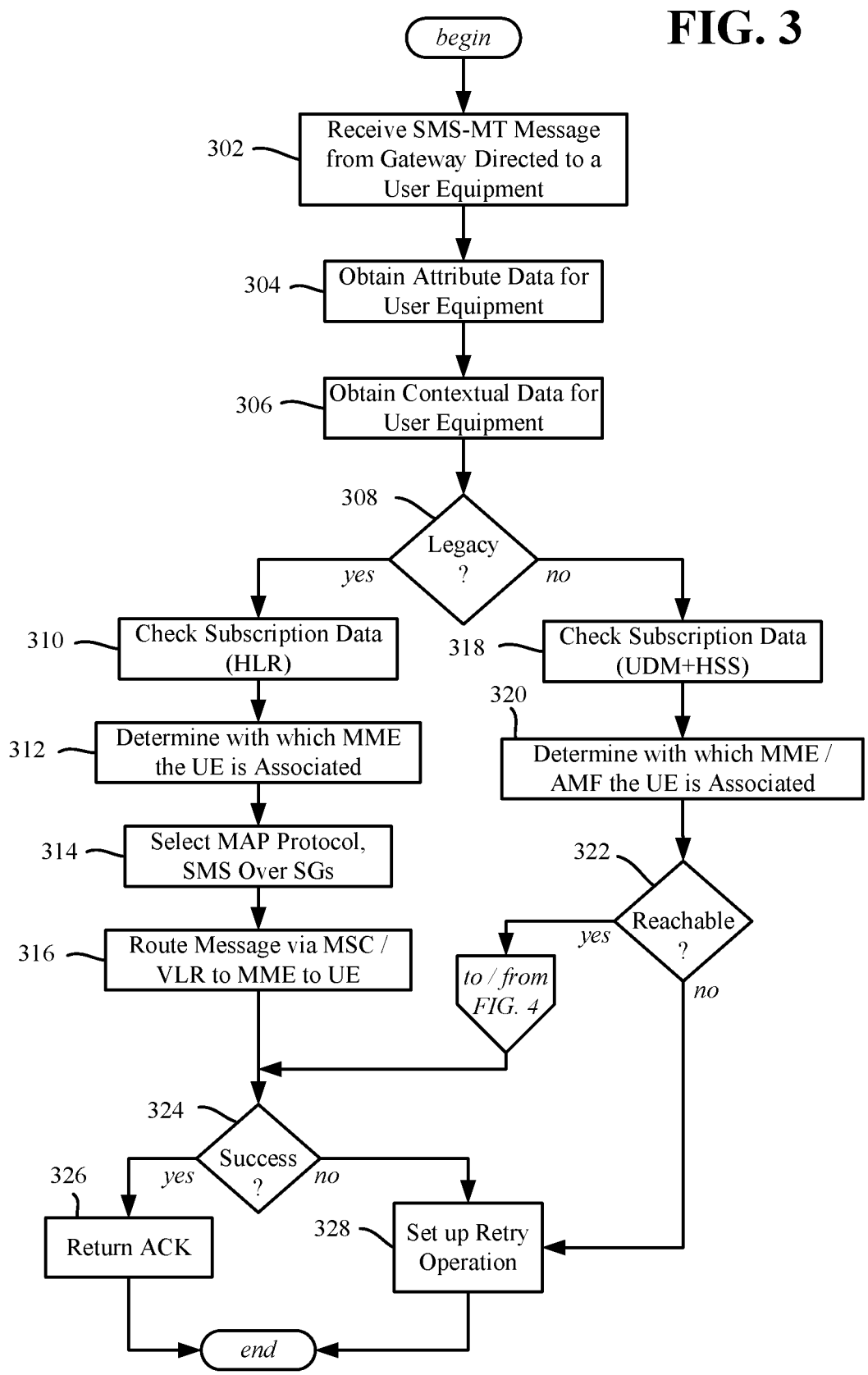
FIGS. 3 and 4 comprise a flow diagram showing example operations of an integrated SMS function to route a mobile terminated SMS message based on device attributes and contextual data, in accordance with various aspects and embodiments of the subject disclosure.
Figure 4:
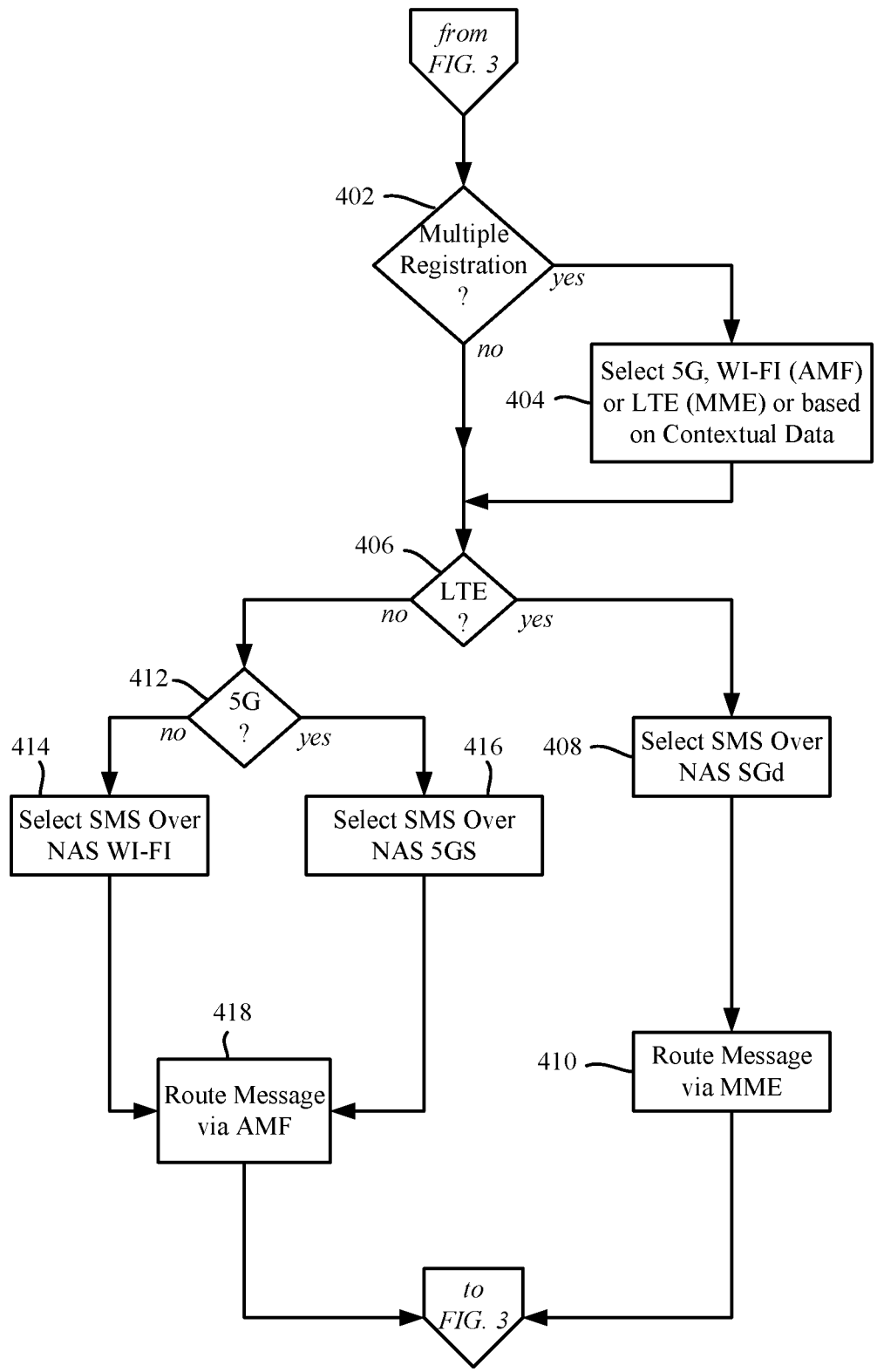

FIGS. 3 and 4 summarize some of the possible operations of an integrated SMS function, beginning at operation 302 where a mobile terminated message is received for routing to a destination user equipment. Operation 304 represents obtaining the attribute data, e.g., device capabilities for the user equipment. Operation 306 represents obtaining the contextual data for the user equipment.

Operation 308 evaluates whether the device is a legacy device; if so, operations 310 and 312 represent communicating with the HLR, MSC/VLR to determine subscription information and determine with which MME the UE is being served. Operation 314 selects the MAP protocol for sending the message as SMS over SGS. Operation 316 routes the message via the MSC/VLR and the MME to the user equipment. In this example, if the message was successfully received as evaluated by operation 324, operation 326 returns and ACK in the opposite direction to the message source. Otherwise, operation 328 sets up a retry operation.

If not a legacy device, operation 308 branches to operation 318 which checks the subscription data. Operation 320 determines which MME or AMF is serving the user equipment. Note that the integrated SMS function thus can determine primary and secondary options for failover/fallback if needed.

Based on the contextual data, operation 322 evaluates whether the device is reachable. Although not explicitly shown, it is understood that other checks can be performed at this time, or possibly earlier in the process, e.g., whether the source is blacklisted, and so on. If not reachable, operation 322 branches to operation 328 to set up a retry operation. This can, for example, determine a wake time of the device, and so on. Otherwise, operation 322 branches to FIG. 4 to deliver the message.

Another aspect of the combination of the cloud storage (the integrated storage) contextual information is the ability to cross-correlate with attributes from the master integrated network database. Cross-correlation can also be performed with the subscription information from the UDM/HSS OR HLR; the integrated SMS function thus knows the access technology to use for the highest chance of message delivery success.

Operation 402 of FIG. 4 evaluates whether the device is registered in more than one mode. If so, operation 404 selects 5G, WI-FI (and the AMF) or LTE (and the MME) based on the contextual data. For example, if a 5G connection is readily useable, then 5G is selected. However, if the 5G cell is overloaded, then WI-FI (if available) or LTE is selected. A user may also set a preference to use WI-FI first, to avoid messaging charges.

Operation 406 determines whether LTE is to be used to deliver the message. If so, operation 408 select SMS over NAS SGd diameter protocol and operation 410 delivers the message by routing the message via the MME.

If not LTE, operation 412 evaluates whether the message is to be sent by 5G or WI-FI. If WI-FI, operation 414 selects SMS over NAS WI-FI, otherwise operation 416 selects SMS over NAS 5GS. Operation 410 delivers the message by routing the message via the AMF serving the UE.

The process returns to FIG. 3, where as described above, a successful delivery returns an ACK at operation 326, otherwise a retry operation is set up at operation 328. Note that FIGS. 3 and 4 are only examples to show some of the possible operations of the integrated SMS function; more operations may be performed, while others can be combined or even eliminated.

Figure 5:
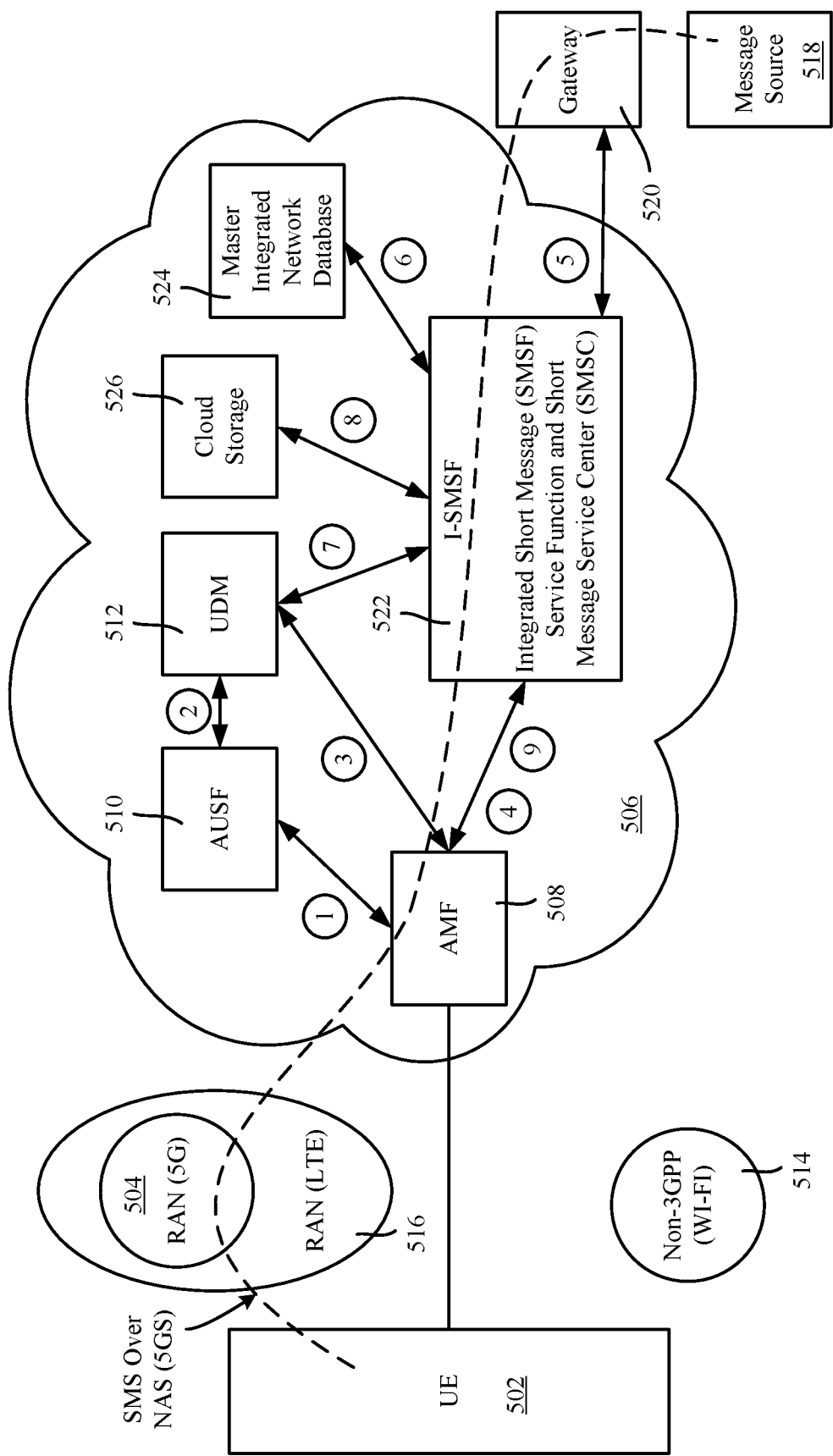
FIG. 5 illustrates an example of routing a mobile terminated SMS message for delivery to a 5G-capable user equipment device that is operating within a 5G coverage area, in accordance with various aspects and embodiments of the subject disclosure.

FIG. 5 shows a more particular example of how a 5G message is routed and delivered. The numeric component labels in FIG. 5 correspond to those of FIG. 1, but start with 5XX instead of 1XX to indicate that there can be multiple networks, network functions, different instances of components, and so on. Further, note that the circled numbers accompanying the arrows generally show the flow of information, but the technology is not limited to the numeric order shown, and some of the operations may be performed in parallel.

In the example of FIG. 5, consider that the user equipment 502 is an IoT device, and, for example that the message source 118 wants to send some information thereto, such as a software update. As shown via arrows (1) to (3), the user equipment 502 registers into the 5G system, is authenticated and becomes associated with the AMF 508. The AMF 508 may need to know which messaging function/gateway to which it is coupled, e.g., the instance of the integrated SMS function 522 in this example (arrow (4)).

When the message source 518 sends the message via gateway 520, the message is received at the integrated SMS function 522 (arrow (5)). The user equipment 502 has its device attributes stored in the master integrated network database 524, which the integrated SMS function 522 obtains (arrow (6)), e.g., based on the device's identification information. At this time, the integrated SMS function 522 knows that the user equipment 502 is a 5G capable device.

Further, the user equipment 502 has its subscription profile in the UDM 512, whereby via the subscription information the integrated SMS function 522 knows the user equipment 502 is registered and authenticated (arrow (7)). This communication also can be used to establish to which particular AMF to route the message, that is, in this way the integrated SMS function 522 knows that the AMF 508 is serving the user equipment 502.

As shown via arrow (8), the integrated SMS function 522 accesses the cloud storage 526 to obtain the user equipment's contextual data, e.g., its reachability state, awake or sleep state, wakeup time if asleep, and so on as described herein. The integrated SMS function 522 synthesizes the various information, in this example knows that the message can be routed via the 5G network equipment/coverage area 504. As shown via arrow (9), the integrated SMS function 522 routes the message via the correct protocol to the correct AMF 508 for delivery to the user equipment.

Significantly, the technology described herein is highly efficient, including that the integrated SMS function 522 sends to the correct AMF the first time, without any fallback and/or query to an MME, and that the correct domain access type has been selected. There is thus ordinarily no need for multiple queries to multiple functions. Further, via the contextual data, the integrated SMS function 522 knows the conditions for delivery, including when the device is reachable (generally no retry needed), or not reachable (can set up a retry delivery for later, without making an unnecessary attempt). The ACK is returned to the source 518, providing a complete end-to-end mobile terminated message delivery solution.

Still further, the integrated SMS function 522 can adjust for poor conditions, e.g., by selecting a different access domain and protocol for devices having multiple registration modes. Note that the AMF 508 tracks the device, and, for example, can potentially shift technologies; for example, if the device is mobile and moves to a different cell, possibly out of 5G coverage, the AMF 508 can deliver via WI-FI or LTE. Note that the AMF 508 can change access domains and protocols as needed, or can communicate back to the integrated SMS function 522 to make any such changes as needed.

In another aspect, the integrated SMS function can expose network analytics (level of metrics in mobility networks) to external entities, e.g., via REST APIs based on role-based access. In addition to exposing network analytics, the integrated SMS function can be implemented in a cloud-native, intelligent way that can be deployed as a virtualized, containerized network function in a cloud native mobile packet core environment. The integrated SMS function is deployable in a dedicated or shared pod environment with integrated analytics for service monitoring, visualization and secure exposure to external entities.

Figure 6:
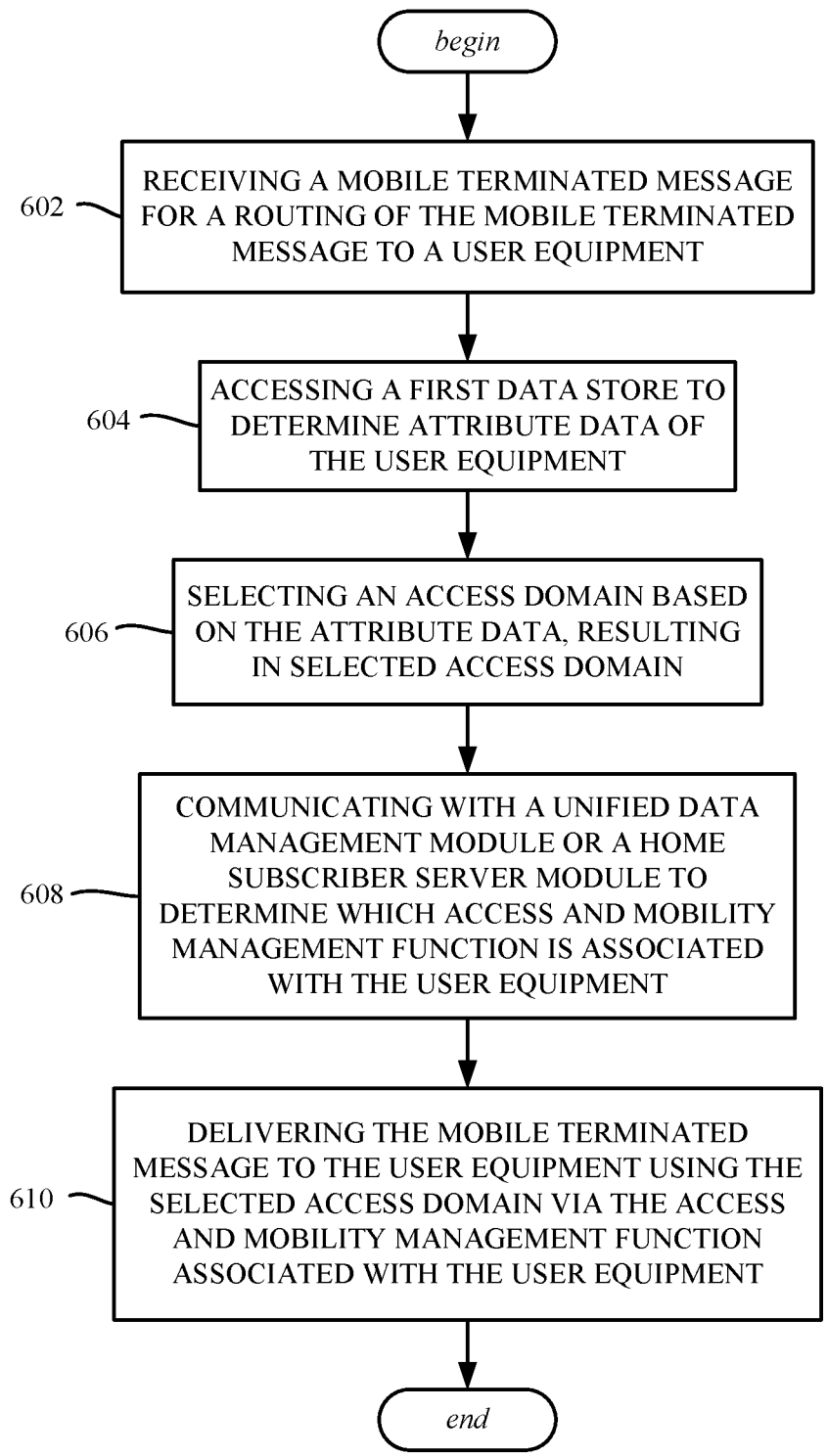
FIG. 6 illustrates example operations of a network function to select an access domain for delivering an SMS message to a user equipment based on attribute data of the user equipment, in accordance with various aspects and embodiments of the subject disclosure.

One or more example aspects are represented in FIG. 6, and can correspond to a system, comprising a processor, and a memory that stores executable instructions that, when executed by the processor of network equipment, facilitate performance of operations. Example operation 602 represents receiving a mobile terminated message for a routing of the mobile terminated message to a user equipment. Example operation 604 represents accessing a first data store to determine attribute data of the user equipment. Example operation 606 represents selecting an access domain based on the attribute data, resulting in selected access domain. Example operation 608 represents communicating with a unified data management module or a home subscriber server module to determine which access and mobility management function is associated with the user equipment. Example operation 610 represents delivering the mobile terminated message to the user equipment using the selected access domain via the access and mobility management function associated with the user equipment.

Communicating can include verifying subscription information associated with the user equipment.

Further operations can include evaluating the attribute data to determine whether to perform the communicating with the unified data management module or with the home subscriber server.

The data store can be a first data store, and further operations can include accessing a second data store to determine user equipment contextual data, and determining from the user equipment contextual data that the user equipment is in a connected state and reachable with respect to the delivering of the mobile terminated message.

The data store can be a first data store, and further operations can include accessing a second data store to determine user equipment contextual data, determining from the user equipment contextual data that the mobile terminated message is in a non-reachable state with respect to the delivering of the mobile terminated message, and performing a retry operation to retry the delivering of the mobile terminated message based on the user equipment being determined to be in a reachable state.

Further operations can include receiving an acknowledgment message indicating that the user equipment received the mobile terminated message, and returning the acknowledgment message via a network gateway to a source of the mobile terminated message.

Selecting the access domain based on the attribute data can include selecting: a fifth generation (5G), a 5G+ access domain, a fourth generation long term evolution (4G LTE) access domain, a third generation access domain, or a WI-FI access domain.

Selecting the access domain based on the attribute data can include selecting a 5G or 5G+ access domain, and delivering the mobile terminated message can include communicating the mobile terminated message using a non-access stratum 5G System protocol.

Selecting the access domain based on the attribute data can include selecting a fourth generation long term evolution (4G LTE) access domain, and wherein delivering the mobile terminated message can include communicating the mobile terminated message using a non-access stratum signaling gateways diameter protocol.

The user equipment can be operating in a dual registration mode, and further operations can include selecting between the first registration mode and the second registration mode for delivering the mobile terminated message based on current radio condition data. Selecting the access domain based on the attribute data further can include selecting the access domain based on selecting the second registration mode for delivering the mobile terminated message.

Further operations can include accessing a second data store to determine contextual data associated with the user equipment, the contextual data including at least one of: policy configuration data, reachability data, sleep mode data and retry data.

Figure 7:
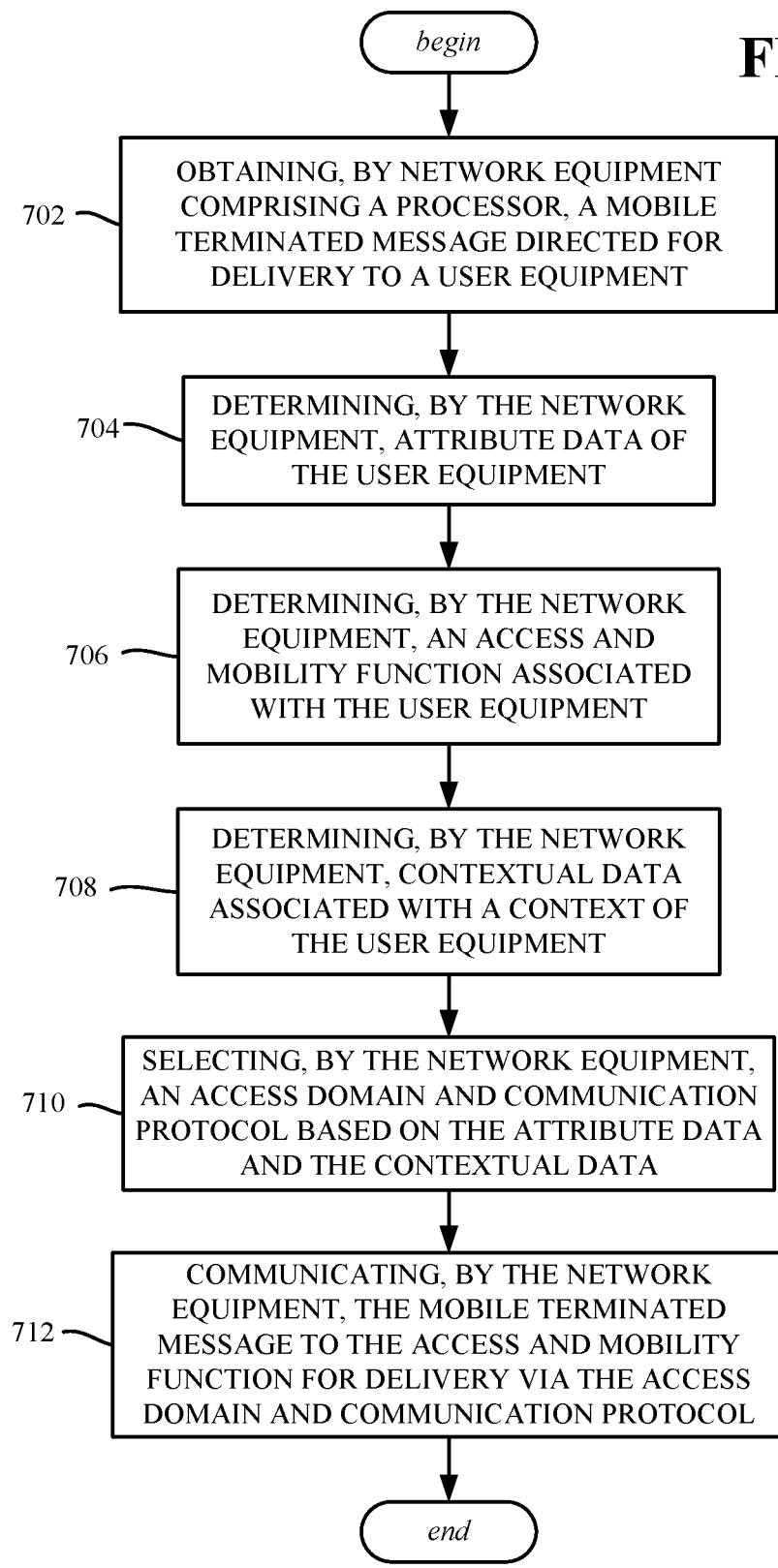
FIG. 7 illustrates example operations of a network function to select an access domain for delivering an SMS message to a user equipment based on attribute data and contextual data of the user equipment, along with an access and mobility function associated with the user equipment, in accordance with various aspects and embodiments of the subject disclosure.

One or more example aspects are represented in FIG. 7, and can correspond to operations of a method. Operation 702 represents obtaining, by network equipment comprising a processor, a mobile terminated message directed for delivery to a user equipment. Operation 704 represents determining, by the network equipment, attribute data of the user equipment. Operation 706 represents determining, by the network equipment, an access and mobility function associated with the user equipment. Operation 708 represents determining, by the network equipment, contextual data associated with a context of the user equipment. Operation 710 represents selecting, by the network equipment, an access domain and communication protocol based on the attribute data and the contextual data. Operation 712 represents communicating, by the network equipment, the mobile terminated message to the access and mobility function for delivery via the access domain and communication protocol.

The contextual data can indicate that the user equipment is in a non-reachable state for a specified time duration determined by its sleep mode patterns, and communicating the mobile terminated message to the access and mobility function can include waiting until the user equipment is in a reachable state.

The attribute data and contextual data of the user equipment can indicate that the user equipment is a fifth generation (5G) capable device operating in a 5G cell site, and wherein the selecting the access domain and communication protocol can include selecting a 5G or 5G+ access domain and non-access stratum 5G System protocol.

The attribute data and contextual data of the user equipment can indicate that the user equipment is a fifth generation (5G) capable device operating in a WI-FI coverage area, and selecting the access domain and communication protocol can include selecting a 5G or 5G+ access domain and a non-access stratum WI-FI protocol.

Determining the access and mobility function associated with the user equipment can include communicating, based on the attribute data, with a unified data management module that indicates with which access and mobility function, of possible access and mobility functions, the user equipment is associated.

Figure 8:
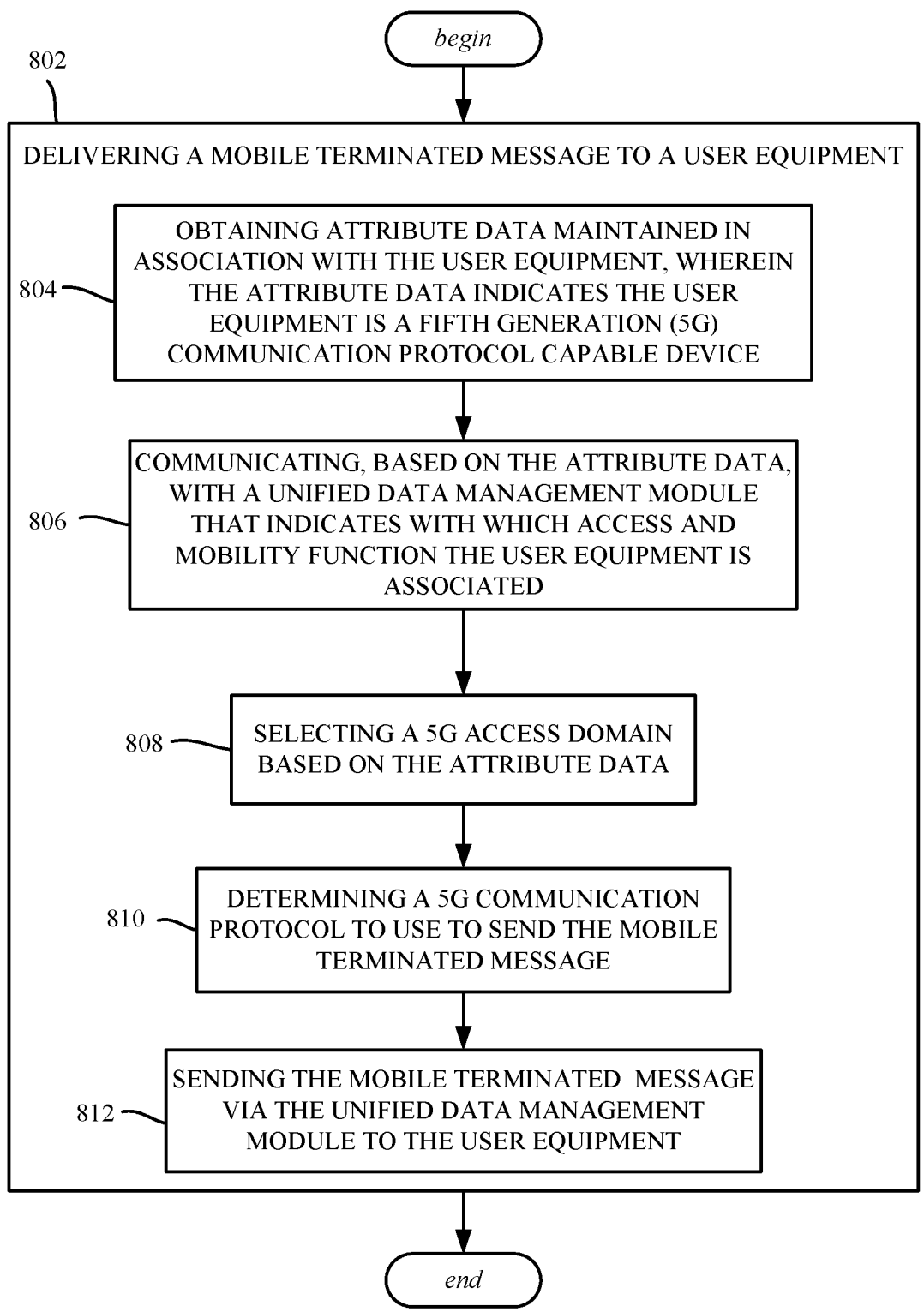
FIG. 8 illustrates example operations of a network function that selects an access domain for delivering an SMS message to a 5G user equipment based on attribute data, in accordance with various aspects and embodiments of the subject disclosure

One or more aspects are represented in FIG. 8, such as implemented in a machine-readable storage medium, comprising executable instructions that, when executed by a processor of a network equipment, facilitate performance of operations. Example operation 802 represents delivering a mobile terminated message to a user equipment. The delivering can comprise obtaining attribute data maintained in association with the user equipment, wherein the attribute data indicates the user equipment is a fifth generation (5G) communication protocol capable device (operation 804), communicating, based on the attribute data, with a unified data management module that indicates with which access and mobility function the user equipment is associated (operation 806), selecting a 5G access domain based on the attribute data (operation 808), determining a 5G communication protocol to use to send the mobile terminated message (operation 810), and sending the mobile terminated message via the unified data management module to the user equipment (operation 812).

Determining the 5G communication protocol to use to send the mobile terminated message can include determining whether the user equipment is communicating via 5G signals or via WI-FI signals.

Further operations can include obtaining contextual data maintained in association with the user equipment; the contextual data can indicate the user equipment is currently in a reachable state.

As can be seen, described is an integrated SMS (delivery) function with analytics that works across 3GPP and non-3GPP radio access technologies. Feature-driven domain selection can launch a single subscriber identification query towards a subscription system front-end (UDM+HSS+HLR) for mobile terminated SMS message delivery. Upon reception of the serving node and registration information, the integrated SMS function selects the access domain and can route the targeted message for delivery to IMS and non-IMS capable devices. The integrated SMS function can interacts with a centralized mapping function to determine the targeted end point based on a policy mapping scheme, including device type, device mode, device grouping, access type, location, priority, contextual state, reachability and so on. By converging the SMSF network function with the SMSC entity, the technology described herein thus results in simplified network functional and operational design with IMS and non-IMS SMS service delivery, with convergence across 5G, LTE, 3G and Wi-Fi technologies, as well as being extendable to next generation wireless networks and evolution(s).

Further, the technology can adopt integrated and smart storage solutions across multiple domains (IP/Non-IP, RAT Types) to allow for message retrieval in case of failures across specific access type. The technology can adopt integrated and flexible retry methods based on device categories, access technologies and sleep/wakeup patterns.

For dual mode device registrations in 5G and LTE (EPS), the technology described herein delivers the MT-SMS in an access domain that is selected based on integrated analytics function mapping with the currently best possible radio conditions in the target cell and UE contextual data. The technology provides for NAS layer real-time congestion monitoring in 5G and LTE/EPS domains. The technology can further facilitate more granular SMS over NAS selection within an LTE/EPS domain, e.g., based on policy configuration, reachability and sleep modes, configurable retries, blacklisting, overload conditions, availability of peer nodes, and so on.

The technology facilitates intelligent, flexible and cost-effective access domain selection including by reducing unnecessary signaling while enhancing the control plane network efficiency. For devices registered in dual mode access domains, such selection can avoid any SMS delivery issues resulting from poor RF coverage, NAS layer congestion, device capabilities (sleep modes and wake up patterns) and so on. The technology is adaptable and self-learning to ensure it tracks the device contextual states and ensures reliable SMS delivery independent of location, time, access type, operating mode and its state.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 9:
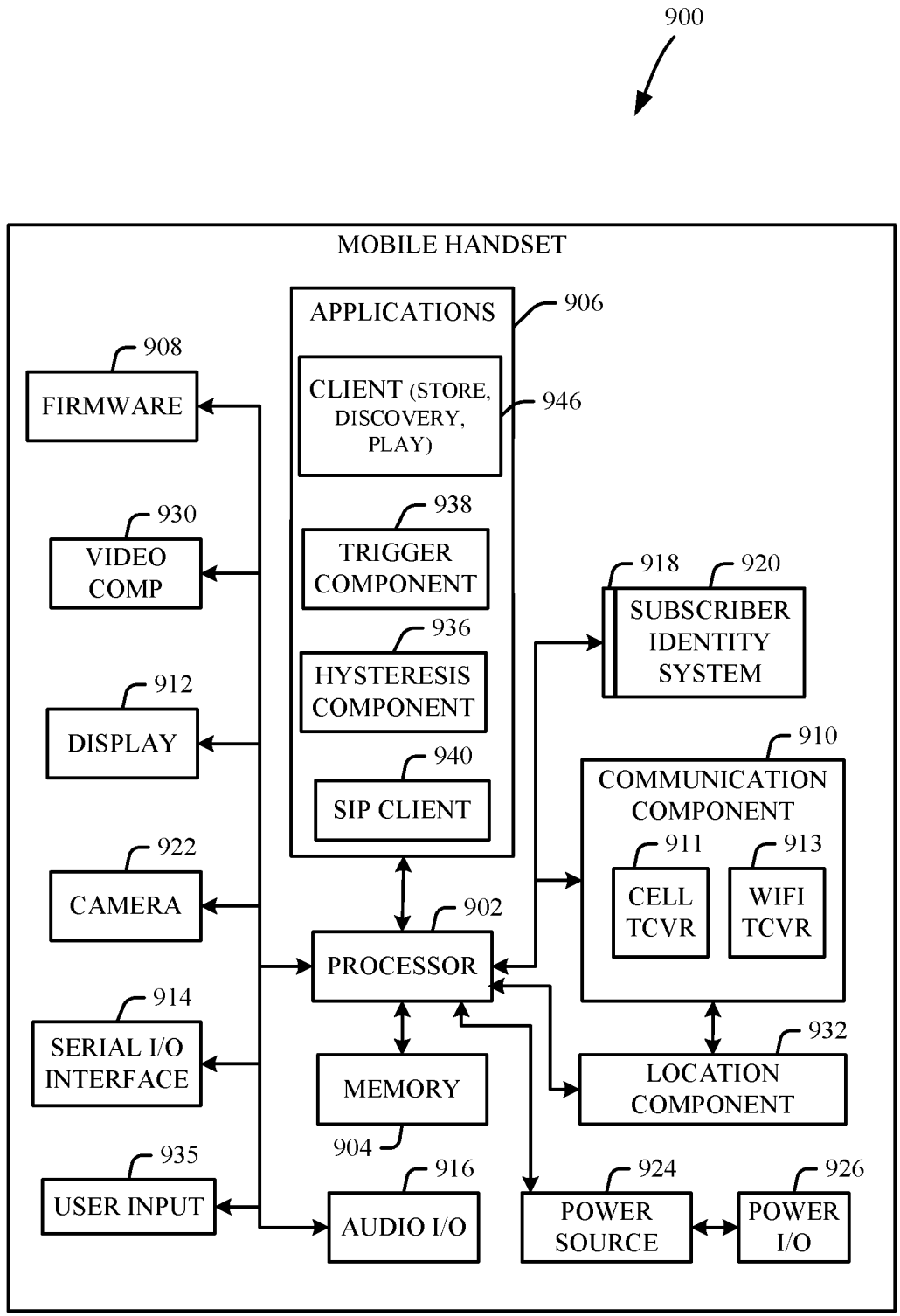
FIG. 9 illustrates an example block diagram of an example mobile handset operable to engage in a system architecture that facilitates wireless communications according to one or more embodiments described herein.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
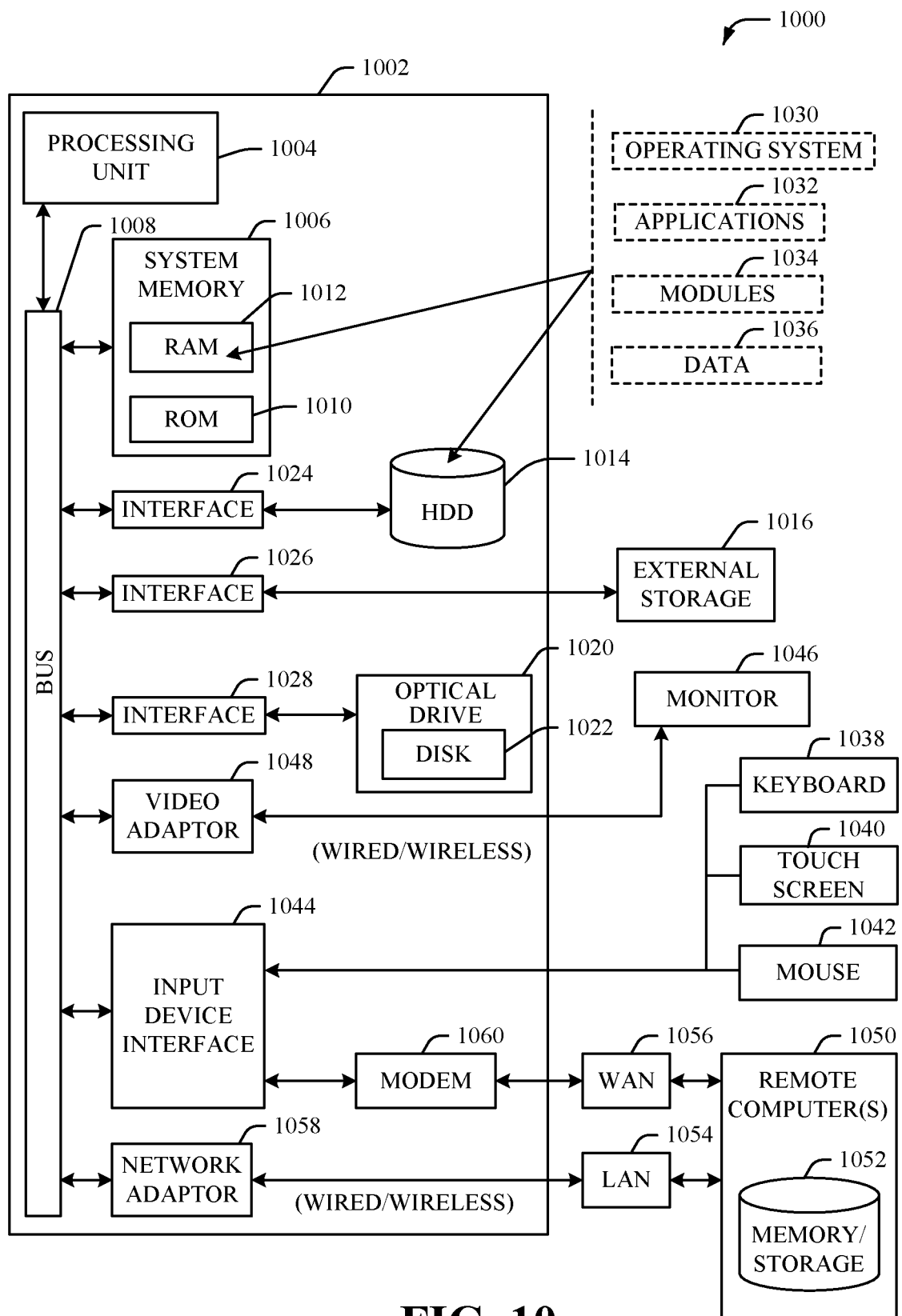
FIG. 10 illustrates an example block diagram of an example computer/machine system operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD), non-volatile memory and other storage technology could be used in addition to, or in place of, an HDD 1014, and can be internal or external. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 11 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. Network equipment, comprising:
a processor; and
a memory that stores executable instructions which, when executed by the processor of the network equipment comprising an integrated short message service function and short message service center function, facilitate performance of operations, the operations comprising:
receiving a mobile terminated message for a routing of the mobile terminated message to a user equipment;
accessing a data store to determine attribute data of the user equipment, wherein the attribute data identifies all radio access technology types supported by the user equipment from a group of radio access technology types supported by the network equipment;
determining contextual data representing a current context of the user equipment;
selecting, based on the attribute data and the contextual data, an access domain and a communication protocol for delivery of the mobile terminated message to the user equipment;
communicating with a unified data management module or a home subscriber server module to determine which access and mobility management function is associated with the user equipment; and
delivering the mobile terminated message to the user equipment using the access domain and the communication protocol via the access and mobility management function associated with the user equipment.

2. The network equipment of claim 1, wherein the communicating comprises verifying subscription information associated with the user equipment.

3. The network equipment of claim 1, wherein the operations further comprise evaluating the attribute data to determine whether to perform the communicating with the unified data management module or with the home subscriber server.

4. The network equipment of claim 1, wherein the data store is a first data store, and wherein the operations further comprise accessing a second data store to determine the contextual data, and determining from the contextual data that the user equipment is in a connected state and reachable with respect to the delivering of the mobile terminated message.

5. The network equipment of claim 1, wherein the data store is a first data store, and wherein the operations further comprise accessing a second data store to determine the contextual data, and determining from the contextual data that the mobile terminated message is in a non-reachable state with respect to the delivering of the mobile terminated message, and performing a retry operation to retry the delivering of the mobile terminated message based on the user equipment being determined to be in a reachable state.

6. The network equipment of claim 1, wherein the operations further comprise receiving an acknowledgment message indicating that the user equipment received the mobile terminated message, and returning the acknowledgment message via a network gateway to a source of the mobile terminated message.

7. The network equipment of claim 1, wherein selecting the access domain based on the attribute data comprises selecting: a fifth generation (5G), a 5G+ access domain, a fourth generation long term evolution (4G LTE) access domain, a third generation access domain, or a WI-FI access domain.

8. The network equipment of claim 1, wherein selecting the access domain based on the attribute data comprises selecting a 5G or 5G+ access domain, and wherein delivering the mobile terminated message comprises communicating the mobile terminated message using a non-access stratum 5G System protocol.

9. The network equipment of claim 1, wherein selecting the access domain based on the attribute data comprises selecting a fourth generation long term evolution (4G LTE) access domain, and wherein delivering the mobile terminated message comprises communicating the mobile terminated message using a non-access stratum LTE signaling protocol.

10. The network equipment of claim 1, wherein the user equipment is operating in a dual registration mode, and wherein the operations further comprise selecting between the first registration mode and the second registration mode for delivering the mobile terminated message based on current radio condition data.

11. The network equipment of claim 10, wherein selecting the access domain based on the attribute data further comprises selecting the access domain based on selecting the second registration mode for delivering the mobile terminated message.

12. The network equipment of claim 1, wherein the operations further comprise accessing a second data store to determine contextual data associated with the user equipment, the contextual data comprising at least one of: policy configuration data, reachability data, sleep mode data and retry data.

13. A method, comprising:
receiving, by network equipment comprising a processor, a mobile terminated message for a routing of the mobile terminated message to a user equipment;
determining, by the network equipment, attribute data of the user equipment from a data store, wherein the attribute data identifies all radio access technology types supported by the user equipment from a group of radio access technology types supported by the network equipment;
obtaining contextual data representing a current context of the user equipment;
choosing, by the network equipment, based on the attribute data and the contextual data, an access domain and a communication protocol for delivery of the mobile terminated message to the user equipment;
communicating, by the network equipment, with a unified data management module to determine which access and mobility management function is associated with the user equipment; and
sending, by the network equipment, the mobile terminated message to the user equipment using the access domain and the communication protocol via the access and mobility management function associated with the user equipment.

14. The method of claim 13, wherein the communicating comprises verifying subscription information associated with the user equipment.

15. The method of claim 13, wherein the data store is a first data store, and further comprising accessing, by the network equipment, a second data store to determine the contextual data, and determining, by the network equipment from the contextual data, that the user equipment is in a connected state and reachable with respect to the delivering of the mobile terminated message.

16. The method of claim 13, wherein the data store is a first data store, and further comprising accessing, by the network equipment, a second data store to determine the contextual data, determining, by the network equipment from the contextual data, that the mobile terminated message is in a non-reachable state with respect to the delivering of the mobile terminated message, and performing, by the network equipment, a retry operation to retry the delivering of the mobile terminated message based on the user equipment being determined to be in a reachable state.

17. A non-transitory machine-readable medium, comprising executable instructions that, when executed by a processor of network equipment, facilitate performance of operations, the operations comprising:
receiving a mobile terminated message for a routing of the mobile terminated message to a mobile device;
determining attribute data of the mobile device from a data store, wherein the attribute data identifies all radio access technology types supported by the mobile device from a group of radio access technology types supported by the network equipment;
determining contextual data representing a current context of the mobile device;
selecting, based on the attribute data and the contextual data, an access domain and a communication protocol for delivery of the mobile terminated message to the user equipment;
communicating with a unified data management module to determine which access and mobility management function is associated with the mobile device; and
providing the mobile terminated message to the mobile device using the access domain and the communication protocol via the access and mobility management function associated with the mobile device.

18. The non-transitory machine-readable medium of claim 17, wherein the selecting the access domain comprises selecting a primary access domain, and selecting a secondary access domain for failover.

19. The non-transitory machine-readable medium of claim 17, wherein the data store is a first data store, and the operations further comprise accessing a second data store to determine the contextual data, and determining, from the contextual data, that the mobile device is in a connected state and reachable with respect to the delivering of the mobile terminated message.

20. The non-transitory machine-readable medium of claim 17, wherein the data store is a first data store, and the operations further comprise accessing a second data store to determine the contextual data, determining, from the contextual data, that the mobile terminated message is in a non-reachable state with respect to the delivering of the mobile terminated message, and performing a retry operation to retry the delivering of the mobile terminated message based on the mobile device being determined to be in a reachable state.

* * * * *